INVENTOR.
RALPH L. BREWER JR.
BY *Alfred R. Fuchs*
ATTORNEY

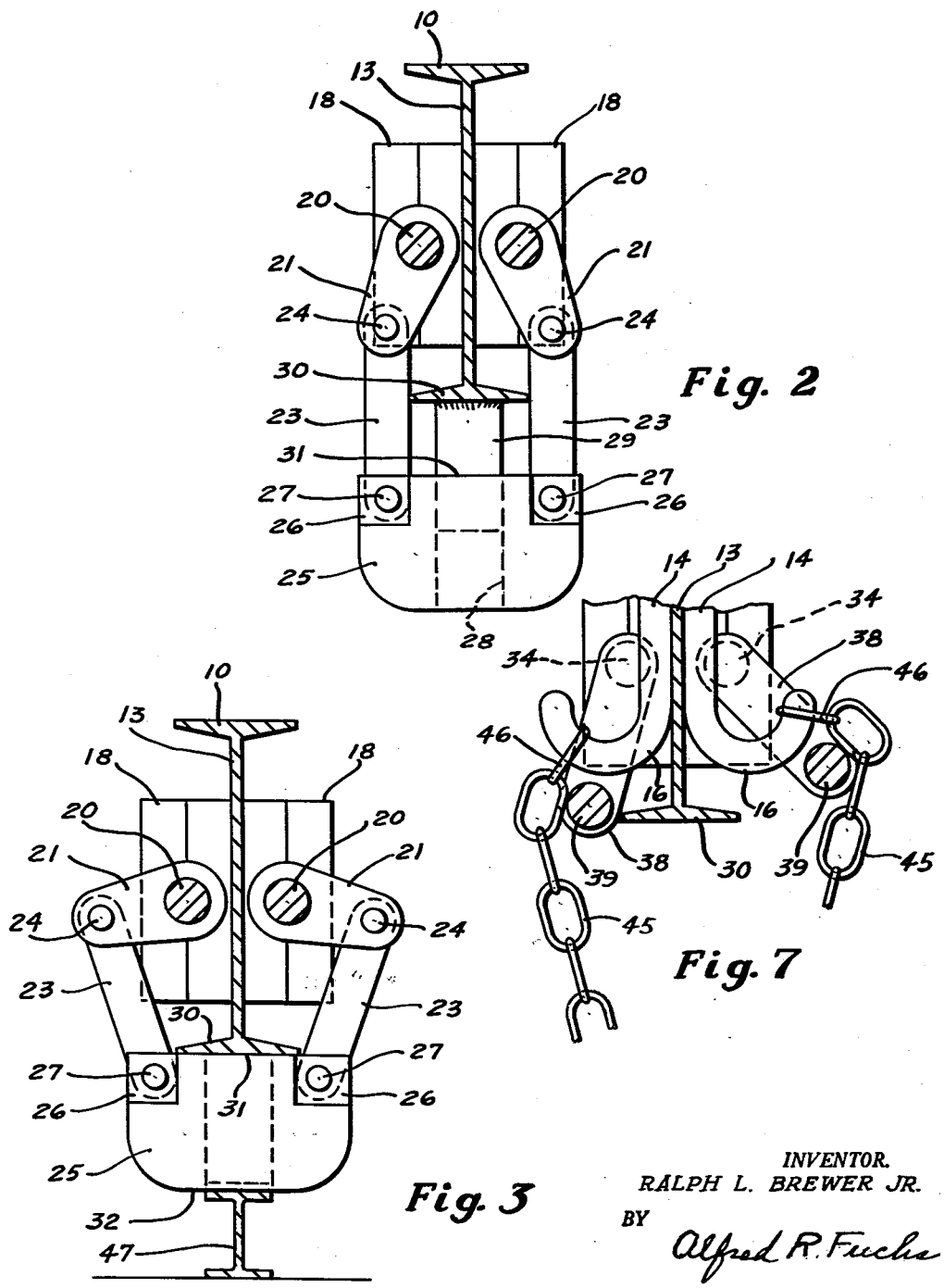

INVENTOR.
RALPH L. BREWER JR.

United States Patent Office 3,079,193
Patented Feb. 26, 1963

3,079,193
AUTOMATIC CHAIN REMOVING DEVICE
Ralph L. Brewer, Jr., Independence, Mo., assignor to Armco Steel Corporation, a corporation of Ohio
Filed Sept. 25, 1959, Ser. No. 842,348
10 Claims. (Cl. 294—75)

My invention relates to automatic chain removing devices, and more particularly to automatic means for disengaging a chain from a hook on material transporting means comprising a carrier that has a plurality of slings of chain suspended from fixed hooks mounted on said carrier.

In transporting certain materials from one location to another in a suspended position on the carrying means, it is often inconvenient and frequently dangerous to manually release the chains that are used for suspending the materials during their transportation, this being particularly true of such materials as steel products that are in a highly heated state while being so transported. In transporting such materials, ordinarily a pair of slings of chain are utilized that are longitudinally spaced along the carrier and along the material that is being transported for supporting the material during such movement from one place to another. In order to deposit such materials in the desired manner, it may be desirable to release the ends of the chains selectively. Such selective release of the chains is provided for in my chain releasing apparatus.

In the type of apparatus to which my chain releasing means is particularly applicable, a pair of hooks is ordinarily provided that are opposite each other and are mounted in fixed position, with which the ends of the chain are engaged, there being suitable rings provided on the ends of the chain for engagement with the hooks. Ordinarily there is a pair of such hooks with which a chain cooperates adjacent each end of the carrier. Under varying circumstances it may be desired to simultaneously release both ends of both chains from the hooks, or it may be desirable to release only one chain at one end of the carrier from its hook and the other end of the other chain in the other end of the carrier from its hook, or other choices of releasing the chains from the hooks may be utilized as the circumstances make it desirable.

It is a further purpose of my invention to provide chain releasing means cooperating with hooks in such a manner that the apparatus can be adjusted to release any chain from any hook by suitable operating means put into action upon the carrier reaching a position suitable for depositing the load on a surface, and which will prevent release of the chain from any hook from which it is not desired to release the same under the particular conditions encountered for that particular load. Such adjustment can be made either before or after the chains have been engaged with the materials that are to be transported by the carrier.

More specifically my invention comprises material transporting means having a body portion in the form of a beam that has pairs of hooks mounted thereon adjacent the opposite ends thereof, said hooks being rigidly secured to the opposite faces of the web portion of the beam and projecting outwardly therefrom in opposite directions and having the opposite ends of chains engaged therewith to form a pair of slings depending from the beam, and to provide means that is actuated by the movement of the beam in proximity to a supporting surface upon which the load is to be deposited, that actuates chain removing members to cause the same to move into a position in which said chain removing members push the rings on the ends of the chain off the hooks.

The means for actuating the chain removing members to move the same into chain removing position comprises a shoe that is mounted on a beam for guided movement toward and away from the beam, and which is moved toward the beam upon the movement of the beam toward the supporting surface, the shoe, by engagement with the load, which will be at such a time located between the supporting surface and the shoe, being moved toward the beam to actuate the mechanism that causes the removing means to move to chain removing position.

It is a particular purpose of my invention to provide a chain releasing means of the above referred to character, that includes a pair of shafts that are mounted on opposite sides of the beam, that are rotated in opposite directions by movement of the shoe toward and away from the beam, this being accomplished by providing oppositely extending cranks mounted on the shafts that are connected with the shoe by links in such a manner that said cranks will be swung outwardly away from each other upon movement of the shoe toward the beam and will move toward each other upon the movement of the shoe into its suspended position at its greatest distance from the beam.

It is a further purpose of my invention to provide, in such an actuating means for the chain removing apparatus, means for limiting the movement of the shoe in opposite directions and means for guiding the shoe so that it will have a straight line movement toward and away from the beam.

It is a further purpose of my invention to provide chain removing means that comprises bars that extend parallel to the shafts and are mounted for swinging movement about the axes of the shafts in such a manner that the bars will move into such a position as to strip the chains from the hooks. Preferably said bars form the cross members of bell crank levers that have legs lying on opposite sides of the hooks, said legs being in the form of links that are rigidly fixed at one end thereof to the ends of the chain removing bars and are each mounted to pivot about the axis of one of said shafts at the other end thereof. Said chain removing members are preferably mounted so as to be detachably connected with the shafts that are actuated by the shoes so as to make it possible to selectively swing any one of said bell crank levers about the axis of the shaft as may be found desirable.

More specifically my invention comprises cranks at the opposite ends of said shoe actuated shafts that have one of said legs of one of said bell crank levers mounted adjacent thereto with which said leg is adapted to be detachably connected to thus swing the bell crank lever and the crank at that end of the shaft together as a unit. Each of said detachable connections is independent of all the others so as to make it possible to swing any selected number of said bell crank levers with the shafts as may be found desirable.

Other objects and advantages of my invention will appear as the description of the drawings proceeds. I desire to have it understood, however, that I do not intend to limit myself to the particular details shown or described, except as defined in the claims.

In the drawings:
FIG. 1 is a view in side elevation of a portion of an article transporting apparatus, showing my invention applied thereto, portions thereof being broken away.
FIG. 2 is a section taken on the line 2—2 of FIG. 1, on a slightly larger scale.
FIG. 3 is a view similar to FIG. 2, but showing the parts in the position that they assume when the load has moved into engagement with the supporting surface upon which it is to be deposited.
FIG. 4 is a section taken on the line 4—4 of FIG. 1, on a slightly larger scale, a portion of the chain being shown therein.

FIG. 7 is a fragmentary section taken on the line 7—7 of FIG. 1, showing the parts in a slightly different position from that shown in FIG. 5.

Figure 1:
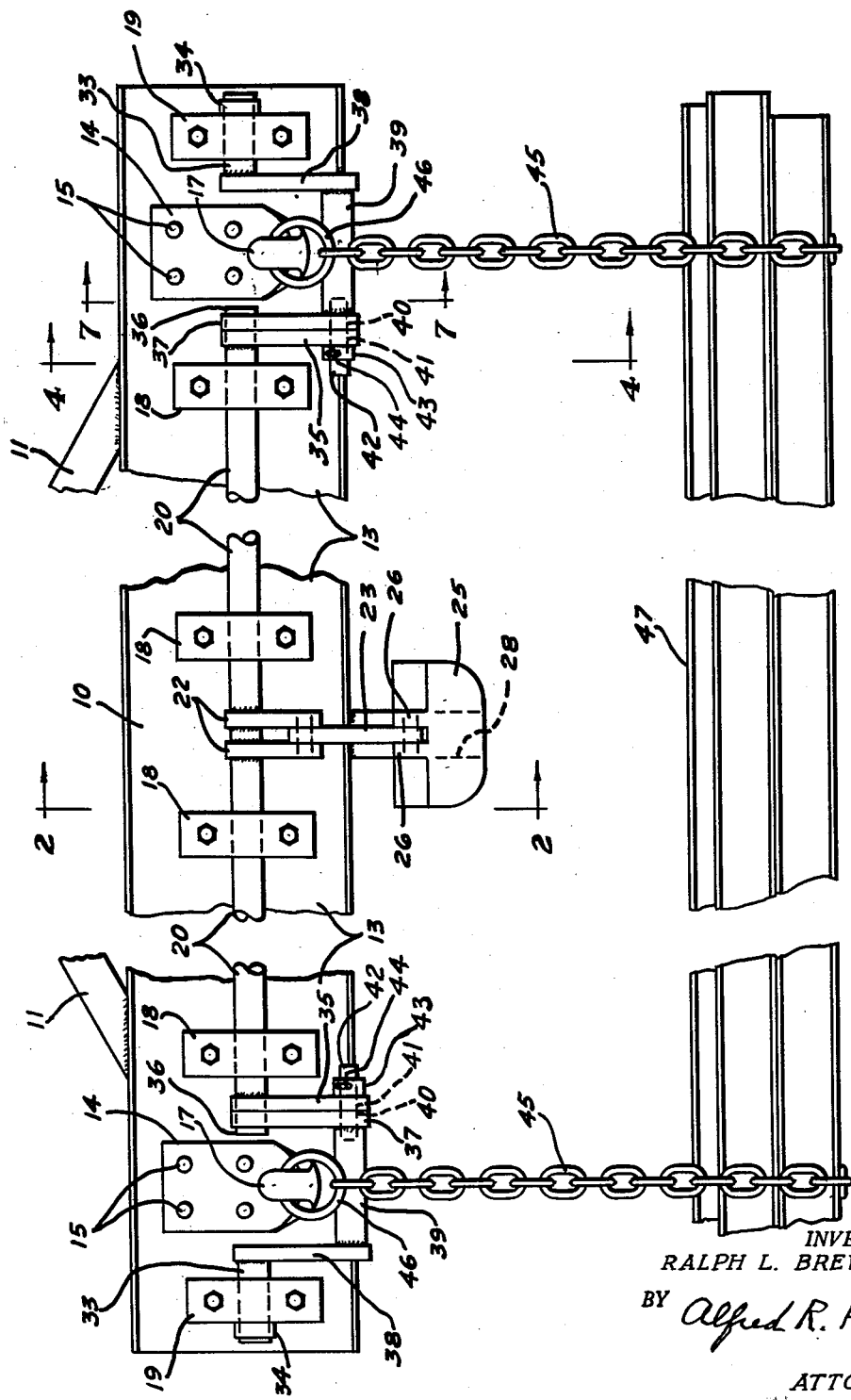

Referring in detail to the drawings, my invention is shown as being applied to a carrier for transporting articles having an elongated body portion in the form of a beam 10, which may be supported in any desired manner, the beam being shown as being provided with suitable means 11 for fastening a hoisting apparatus thereto. The web portion 13 of said beam has a plurality of hooks secured thereto on the opposite faces thereof, said hooks having wide flat attaching portions 14 that are secured to said web portion 13 in fixed position in any desired manner, as by means of rivets 15. At the lower end of said attaching portions are outwardly and upwardly curved hook portions 16, which terminate in rounded upper ends 17, said hook portions being directed oppositely on opposite sides of the beam.

Also mounted on the web portion 13 of said beam are bearing members 18 and 19. Mounted on each side of the beam to rotate in the bearings 18 is a crank shaft 20. Cranks 21 are provided on the crank shafts 20, being made up of a pair of members 22 that are fixed to the shaft 20 in spaced relation to receive a link 23 between the same. The links 23 are pivoted to the cranks 21 by means of the pivot members 24. A shoe 25 is suspended from the links 23, said shoe being a heavy casting that is provided with paired ears 26 on opposite sides thereof receiving the links 23 between the same, pivot pins 27 pivotally connecting the lower ends of the links 23 with said ears. Said shoe 25 is further provided with a vertical passage 28, which is cylindrical in character, and which slidably receives a guide post 29 welded to the bottom face of the bottom flange 30 of the beam 10. Said shoe is provided with a flat top face 31 that is adapted to engage the bottom face of the flange 30 when it is in the position shown in FIG. 3, and which is adapted to engage a surface or a suitable load carried by the transporting means when in engagement with such a surface by means of the flat face 32 on the bottom thereof.

Stub shafts 33 are mounted in the bearings 19 on each side of the beam and are provided with collars 34 for holding the same against endwise movement in the bearings 19. Mounted adjacent each end of each of the shafts 20 is a crank 35, being fixed thereto as by means of welding, said cranks 35 extending in parallel relationship to each other and extending in the same direction with respect to the axis of the shaft 20 as the cranks 22. The shafts 20 have portions 36 that extend beyond the cranks 35 and have pivotally mounted on each of said ends a link 37. A corresponding link 38 is mounted on each of the stub shafts 33, being fixed thereto by welding. Mounted in fixed position between the links 37 and 38 and extending parallel to the axis of the shafts 20 are chain removing bars 39, the same being fixed to the ends of the links 37 and 38 remote from the shafts 20 and 33 by welding. It will be noted that each pair of links 37 and 38 and the cross member 39 form a bell crank lever that straddles one of the hooks 16 with the cross bar 39 lying in a position such that it will be located below the hook with which it is associated when in the position shown in FIG. 1.

Figure 4:
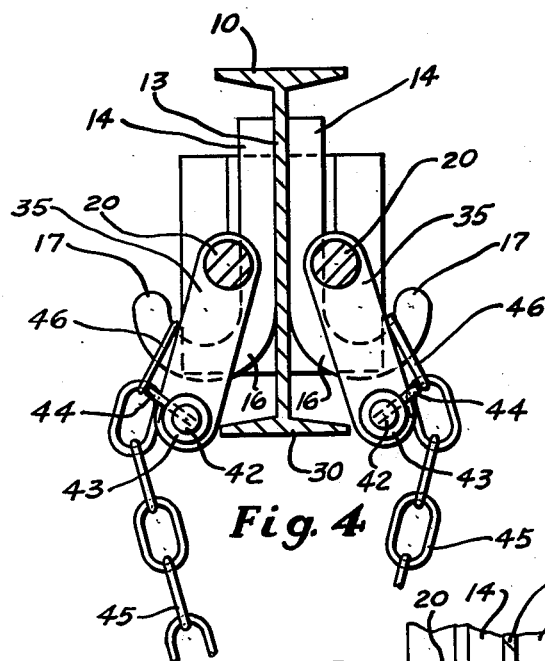
Figure 5:
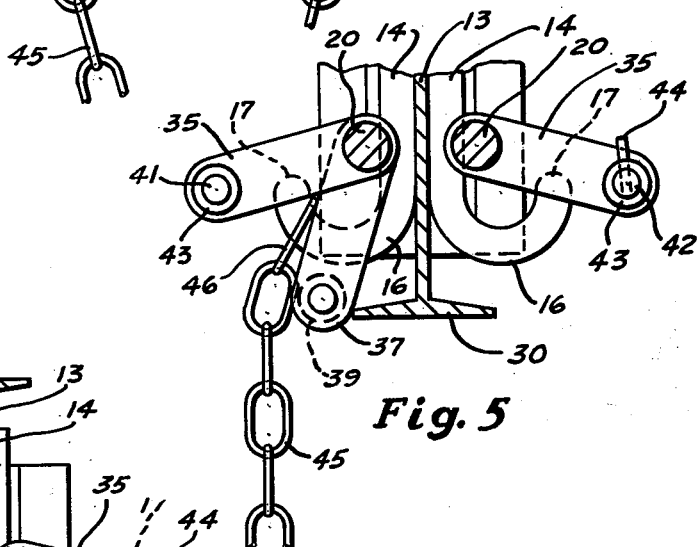
FIG. 5 is a fragmentary section similar to FIG. 4, showing one of the chain removing devices moved to chain removing position and showing the other chain removing device in its inactive position.
Figure 6:
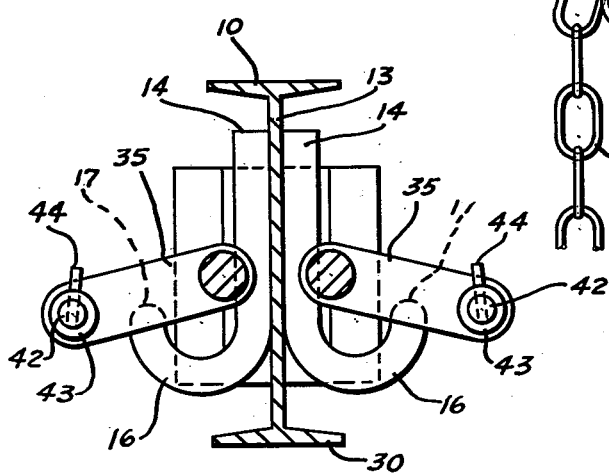
FIG. 6 is a view similar to FIG. 4, but showing both of the chain releasing devices moved to chain releasing position.

Each of said links 37 is provided with a transverse passage 40 therein, that extends into the cross bar 39, and an opening 41 is provided in each of the cranks 35, a pin 42 being adapted to be inserted in the aligning openings 40 and 41 to detachably secure the link 37 of each of the bell crank levers to the crank 35 associated therewith, so that said bell crank lever and the crank 35 will move in unison. In order to prevent accidental disengagement of the pin 42, a hub 43 is provided on each of the cranks 35, which is provided with an opening through which a locking pin 44 extends, said locking pin extending into an aligning opening in the pin 42, as shown in FIGS. 4, 5 and 6. In FIG. 4 the pins 42 are shown in position for securing the bell crank levers to the cranks 35.

In FIGS. 1 and 4 the parts are shown in the position that they have when the load is carried by the chains 45, which have the rings 46 provided on the ends thereof engaged with the hooks 16. The load is indicated diagrammatically at 47, it being of course, to be understood that any number of objects that are of proper length can be carried by the slings formed by the chains 45. When the load is being carried by the chains 45, the shoe 25 will have the position shown in FIGS. 1 and 2 with the cranks 21 extending obliquely downwardly with respect to the shaft 20. With the shoe in this position and the load carried by the chains 45, the bell crank levers would be free to move downwardly into engagement with the opposite sides of the flange 30 of the beam 13, unless secured to the cranks 35 by the pins 42. However, if the pins 42 are in position as shown in FIG. 4, the links 37 and 38 and the cranks 35 will have the same angular position.

With the pins 42 thus detachably connecting the links 37 and the cranks 35, as shown in FIG. 4, upon the load being deposited on a surface, such as indicated for the load 47 in FIG. 3, the bottom surface 32 of the shoe 25 will engage the load and as the beam 13 is lowered the shoe 25 will travel toward said beam, being guided by the guide member 29, and will continue such movement until the flat top face 31 thereof engages the lower flange 30 of the beam. If the pins 44 are in the position shown in FIG. 4 during movement from the position of the shoe 25 shown in FIG. 2 to that shown in FIG. 3 the cranks 35 will move from the position shown in FIG. 4 to that shown in FIG. 6, carrying with them the chain removing bars 39 due to the connection between the members 35 and 37, the chain removing bars 39 having, in such movement, passed through a position in which the rings 46 of the chains will be pulled off the hooks 16, the chains being slack when the load has been thus deposited on a supporting surface.

In FIG. 5 the position of the parts is shown in which the right hand crank 35 is fixed to the link 37 of the bell crank lever on that side of the beam by means of the pin 42, while the pin 42 has been removed from the opening 41 of the left hand lever 45 so as to leave the link 37 and the chain removing cross bar 39 behind, the links 37 and 38 under these circumstances being free to drop into a position in engagement with the lower flange 30 of the beam, the left hand links 37 and 38 being shown in this position in FIGS. 5 and 7, respectively. The adjustment of the parts shown in FIG. 5 will cause the removal of the chain only from the hook 16 on the right hand side of the beam, the chain remaining in engagement with the hook 16 on the left hand side thereof, the bar 39 being shown in the position reached just before it removes the ring 46 from the right hand hook by pushing on chain 45 at the right side of FIG. 7. It will accordingly be obvious that any one of the rings 46 on the ends of the chains 45 can be removed from its hook automatically by inserting the proper pin 42 in position to cause the chain removing bars 39 to be moved with the cranks 35 upon engagement of the shoe 25 with the load upon its being deposited on a supporting surface. Thus all of the chains can be disengaged from all of the hooks simultaneously or any selection of the hooks from which the chains are to be removed can be chosen as may be found desirable for depositing the load in the desired manner. It will be further noted that a strong, sturdy structure is provided that has the hooks 16 mounted in fixed position so that the chains can not be accidentally disengaged therefrom while the load is being transported, but from which the chains can be positively removed when that is desired upon deposit of the load on a supporting surface.

What I claim is:

1. The combination with a carrier comprising a beam having hooks mounted on opposite sides thereof, of a chain engaging said hooks and means for removing said chain from said hooks, comprising a shaft extending longitudinally of said beam on each side thereof mounted on said beam for rotation about its axis, means on said carrier for simultaneously rotating said shafts in opposite directions, cranks on said shafts and chain removing bars detachably connected with said cranks to swing about the axes of said shafts in opposite directions with said shafts into chain removing position.

2. The combination with a carrier comprising a beam having, hooks mounted on opposite sides thereof, of a chain engaging said hooks and means for removing said chain from said hooks, comprising a shaft extending longitudinally of said beam on each side thereof mounted on said beam for rotation about its axis, means on said carrier for simultaneously rotating said shafts in opposite directions, cranks on said shafts, chain removing bars, a pair of links mounted for rotation about the axis of each of said shafts, each pair of links being fixed to the opposed ends of one of said bars to mount said bars in spaced relation to said shafts to each swing about the axis of one of said shafts and means detachably connecting one link of each pair with a crank.

3. The combination with a carrier comprising a beam having fixed hooks mounted thereon in opposed relation on opposite sides of said beam with one opposed pair adjacent each end of said beam, of a chain engaging each pair of hooks and means for selectively removing the ends of said chains from said hooks comprising a shoe mounted on said beam for movement toward and away therefrom, chain removing members mounted on said beam for swinging movement into and out of chain removing position and means independently detachably connecting said shoe with each of said chain removing members to swing said connected chain removing members into chain removing position upon predetermined movement of said shoe toward said beam.

4. The combination with a carrier comprising a beam having fixed hooks mounted thereon in opposed relation on opposite sides of said beam with one opposed pair adjacent each end of said beam, of a chain engaging each pair of hooks and means for selectively removing the ends of said chains from said hooks comprising a shoe mounted centrally of said beam below the same for guided movement toward and away from said beam, chain removing members mounted on said beam for swinging movement into and out of chain removing position and means independently detachably connecting said shoe with each of said chain removing members to swing said connected chain removing members upwardly from a lower inoperative position to a chain removing position upon predetermined movement of said shoe toward said beam.

5. The combination with a carrier comprising a beam having fixed hooks mounted thereon in opposed relation on opposite sides of said beam with one opposed pair adjacent each end of said beam, of a chain engaging each pair of hooks and means for selectively removing the ends of said chains from said hooks comprising a shoe mounted centrally of said beam below the same for guided movement toward and away from said beam, longitudinally extending shafts rotatably mounted on opposite sides of said beam, means connecting said shafts with said shoe to rotate said shafts in opposite directions upon movement of said shoe toward said beam, chain removing members mounted on said beam for swinging movement into and out of chain removing position and means independently detachably connecting said shafts with said chain removing members to swing said connected chain removing members into chain removing position upon predetermined movement of said shoe toward said beam.

6. In a carrier structure, a beam, hooks mounted in fixed position on opposite sides of said beam in opposed relation, a longitudinally extending shaft mounted for rotation in bearings on each side of said beam, a crank on each shaft between the ends thereof, a shoe, means for mounting said shoe below said beam for movement toward and away from said beam comprising a link interposed between said shoe and each of said cranks and pivotally connected with said shoe and crank, a chain engaging said opposed hooks, cranks adjacent both ends of each of said shafts, chain removing members each comprising a bar extending parallel to a shaft and mounted for swinging movement about the axis of said shaft, said mounting comprising a member mounted to swing on said shaft and rigidly secured to said bar, and means detachably connecting each of said members with one of said end cranks.

7. In a carrier structure, a beam, hooks mounted in fixed position on opposite sides of said beam in opposed relation, a longitudinally extending shaft mounted for rotation in bearings on each side of said beam, a crank on each shaft between the ends thereof, a shoe, means for mounting said shoe centrally below said beam for movement toward and away from said beam comprising a link interposed between said shoe and each of said cranks and pivotally connected with said shoe and crank, a chain engaging said opposed hooks, cranks adjacent both ends of each of said shafts, stub shafts aligning with each of said longitudinally extending shafts and spaced from the opposite ends thereof, chain removing members each comprising a bar and means for mounting said bar for swinging movement about the axis of a longitudinally extending shaft with the axis of said bar extending parallel to said shaft comprising a pair of links fixed to said bar at opposite ends thereof, one of said links being mounted on said stub shaft to swing about the axis of said longitudinal shaft and the other link being pivotally mounted on said longitudinally extending shaft adjacent one of said end cranks, and means detachably connecting said last mentioned link and crank to move in unison.

8. In a carrier structure, a beam, hooks mounted in fixed position on opposite sides of said beam in opposed relation, a longitudinally extending shaft mounted for rotation in bearings on each side of said beam, a crank on each shaft, a shoe, means for mounting said shoe below said beam for movement toward and away from said beam comprising a link interposed between said shoe and each of said cranks and pivotally connected with said shoe and crank, a chain engaging said opposed hooks, bell cranks mounted to swing about the axes of said shafts across the paths of said chains and means for detachably connecting each of said bell cranks with one of said shafts to swing about its axis in the same direction and through the same arc as said shaft upon rotation of said shaft.

9. The combination with a carrier, comprising a beam having fixed hooks mounted thereon in opposed relation, of chains engaging said hooks and means for removing said chains from said hooks, comprising a shaft extending longitudinally of said beam on each side thereof each mounted on said beam for rotation about its axis, means on said carrier for rotating said shafts about their axes in opposite directions, chain engaging bars, pairs of links, the links of each pair being mounted for rotation about the axis of one of said shafts adjacent one end of each link and fixed at the other ends thereof to the opposite ends of one of said bars, cranks fixed on said shafts and means independently detachably connecting each of said cranks with one of said links of each pair to swing the bar connected with said pair of links about the axis of said shaft to move said bar into chain removing position.

10. The combination with a carrier having hooks mounted thereon of chains engaging said hooks and means for removing said chains from said hooks comprising a shoe mounted on said carrier, a shaft mounted for rotation on said carrier, means connecting said shoe and shaft to rotate said shaft upon movement of said shoe, a pair of chain engaging bars, a pair of links adjacent each end of said shaft mounted for rotation about the axis of said shaft adjacent one end of each link, said links being fixed at the other ends thereof to the opposite ends of said bars, a crank fixed on said shaft adjacent each end thereof, and means detachably connecting each of said cranks and one of the links of each pair to swing the bar provided with said links about the axis of said shaft to move into chain removing position upon rotation of said shaft in a predetermined direction through a predetermined arc.

References Cited in the file of this patent

UNITED STATES PATENTS

| | | |
|---|---|---|
| 1,221,693 | Crosby | Apr. 3, 1917 |
| 1,862,312 | Kositzky | June 7, 1932 |
| 2,603,523 | Cameron | July 15, 1952 |
| 2,761,725 | Rushing | Sept. 4, 1956 |
| 2,813,744 | Hutchinson | Nov. 19, 1957 |